United States Patent [19]
Duke et al.

[11] 3,779,329
[45] Dec. 18, 1973

[54] REARFACING ENGINE AND REARAXLE HAVING OFFSET DRIVE LINE

[75] Inventors: Edward D. Duke, Chicago; Julius F. Marquardt, Westchester, both of Ill.

[73] Assignee: International Harvester Company, Chicago, Ill.

[22] Filed: Nov. 15, 1972

[21] Appl. No.: 306,662

[52] U.S. Cl. ............................................. 180/54 F
[51] Int. Cl. .............................................. B60k 5/02
[58] Field of Search ..................... 180/54 F, 42, 23, 180/53 FE, 53 CD; 64/31

[56] References Cited
UNITED STATES PATENTS

| | | | |
|---|---|---|---|
| 2,322,477 | 6/1943 | Sjoberg | 180/54 F |
| 2,532,057 | 11/1950 | Carlson et al. | 180/54 F X |
| 2,785,763 | 3/1957 | Stump | 180/54 F |
| 3,478,876 | 10/1969 | Magnier | 180/54 F |

*Primary Examiner*—Kenneth H. Betts
*Assistant Examiner*—David M. Mitchell
*Attorney*—Floyd B. Harman

[57] ABSTRACT

Automotive vehicle comprising an engine mounted adjacent one end of the vehicle having its power output end extending forwardly from the one end; and a power drive train connected to the power output end of the engine providing a path for conveying power, leading from the engine forwardly, then downwardly and laterally to one side of the engine, then rearwardly beneath that side to the engine rear, then laterally beneath the engine rear to the opposite side of the engine, thence forwardly beneath that side of the engine for driving connection with a wheel axle of the vehicle.

12 Claims, 4 Drawing Figures

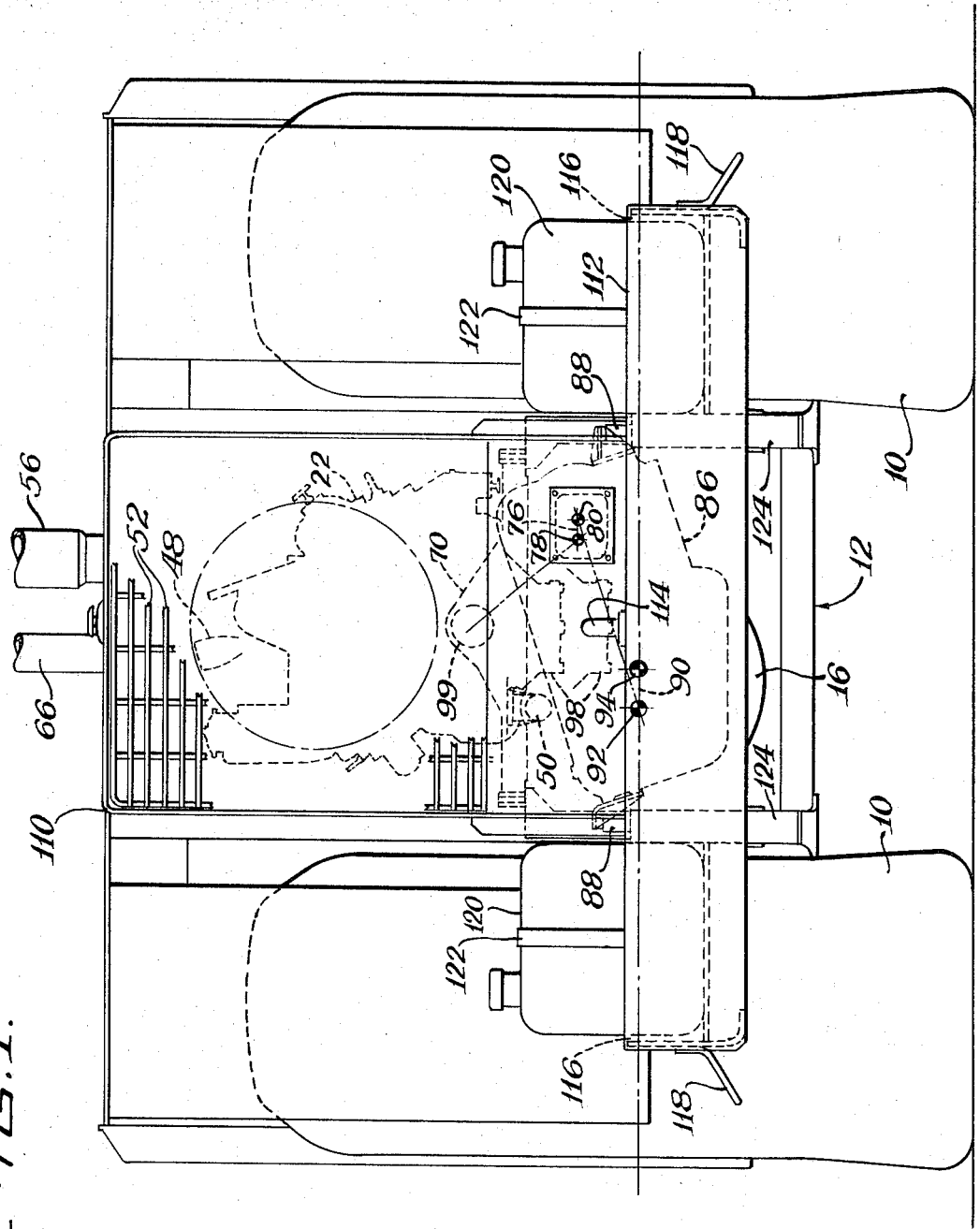

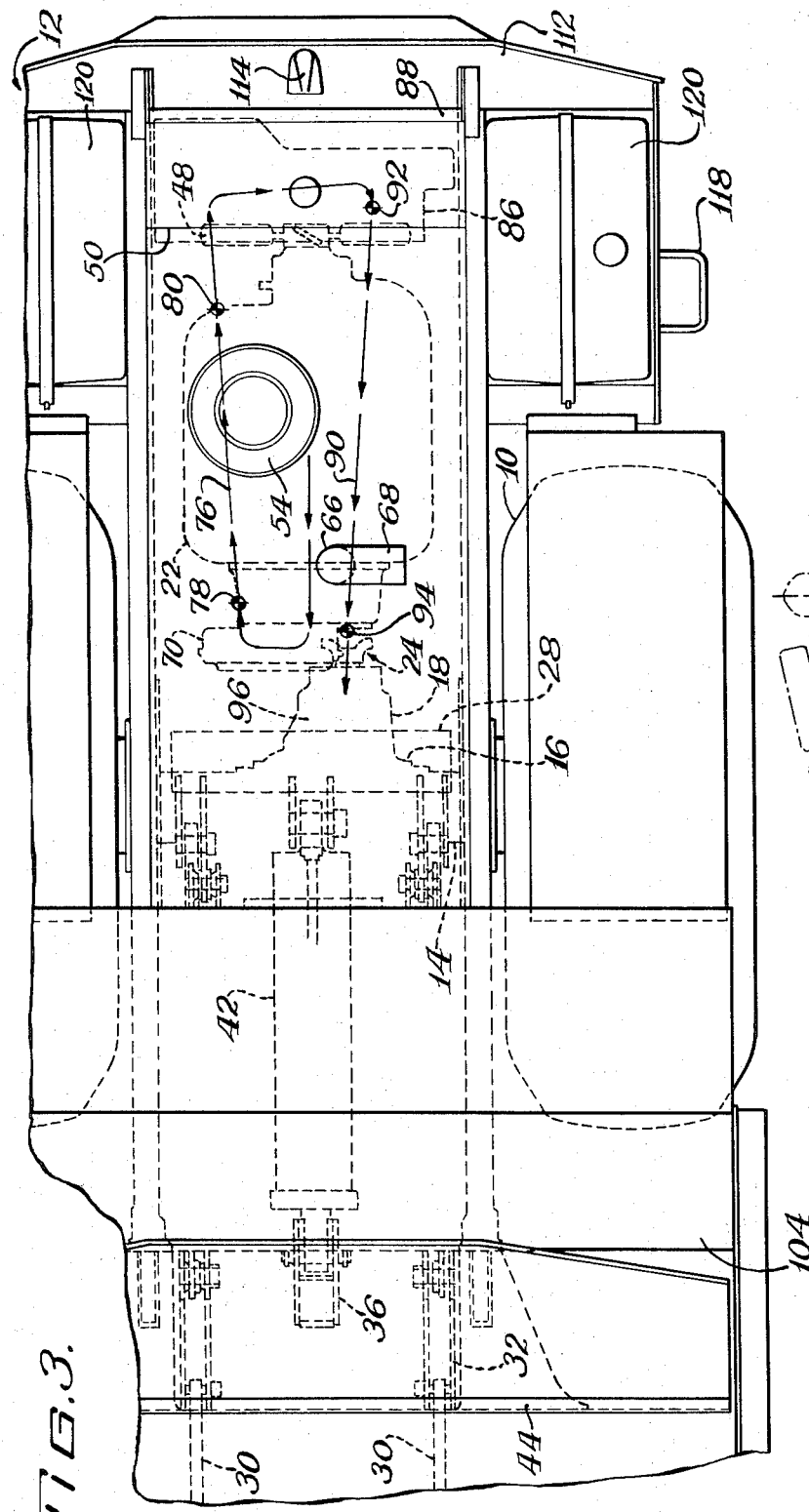
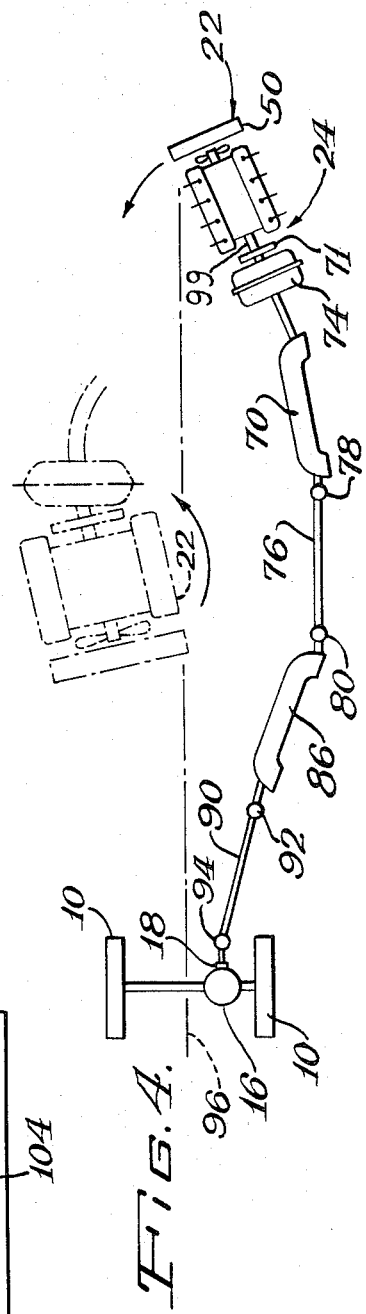
FIG.3.
FIG.4.

REARFACING ENGINE AND REARAXLE HAVING OFFSET DRIVE LINE

This application relates to a vehicle with a rear facing engine and a rear axle, having an offset drive line coupling the engine to the rear axle. The drive line is composed of plurality shaft sections having liberal length to save wear on alignment joints and having adequate offset for engine accessibility, all in a highly compact engine-torque-converter-transmission-differential arrangement.

Heretofore, propulsion engines have been mounted directly above a pair of oppositely extending driven axle shafts on a vehicle, or mounted offset to the driven axle so as to be on an opposite side thereof from a transmission mechanically coupling together the engine and driven axle.

Ideally, the offset and consequent overhang of a rear mounted engine are kept at a minimum. So a problem of exaggerated overhang can arise when engine and transmission are required, by design considerations, to be offset to the same side of the axle as shown, for example, in U.S. Pat. No. 2,785,763 (rearward offset).

By providing power train structure as close as practicable to the driven axle at one side thereof without encroaching from such side to or past the axle, our invention constitutes a solution materially reducing if not substantially eliminating the foregoing problem, as will now be explained in detail. Features, objects, and advantages will either be specifically pointed out or become apparent when, for a better understanding of the invention, reference is made to the accompanying drawings which show a preferred embodiment thereof and in which:

FIG. 1 is in elevation, as viewed from the rear of a dual engine elevating scraper embodying the invention;

FIGS. 2 and 3 are in elevation and in plan, of the rear end portion of the scraper appearing in FIG. 1, as viewed from respectively the right side and the top; and FIG. 4 is a fanciful "unwrapped" view, similar to FIG. 3 and presented correspondingly in top plan for an understanding of the ultimate down-spiralling wrap-around effect of the power train.

Figure 2:
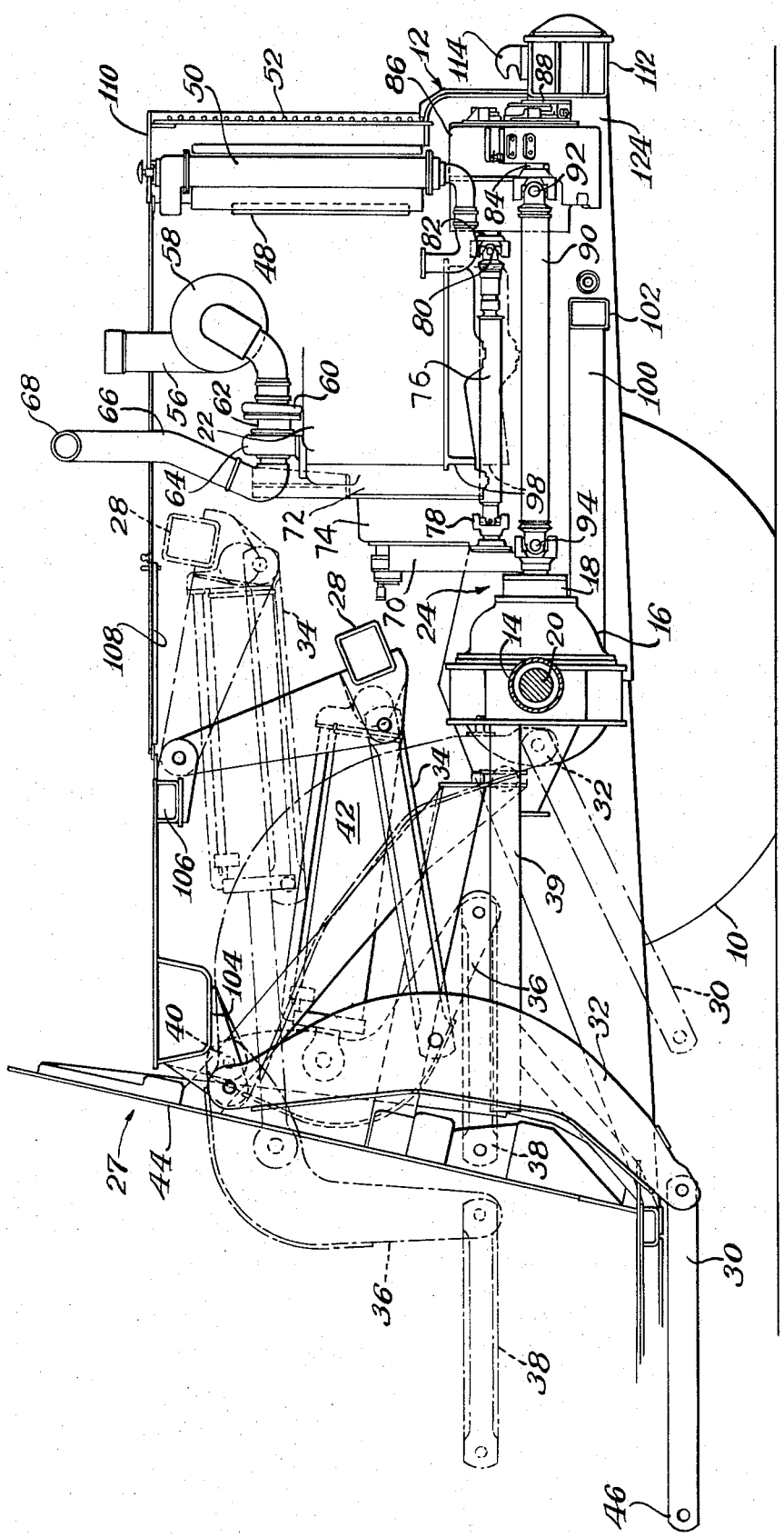

More particularly as shown in the drawings, two rear wheels 10 are shown supporting the rear of a scraper unit 12 included in a tractor scraper combination having a two-wheel tractor, not shown. The complete combination is known as a dual engine elevation scraper and, at a work site, it digs and loads a large quantity of dirt or spoil into a scraper bowl, not shown, and transports same to another site where it is unloaded.

A rear axle 14 for the rear wheels 10 includes a slightly offset differential 16 having a head 18, and a pair of oppositely extending axle shafts which are connected to drive the wheels 10 and one of which is shown at 20 in FIG. 2. Another axle, not shown, beneath the referred to two-wheel tractor is Power driven by one of the dual engines, namely, the tractor engine which is not shown.

In a position confined thereon all rearwardly of the rear axle 14, the scraper 12 carries the other engine, namely, a short supercharged V-8 engine 22 and a novel power drive train 24 coupling the engine to the differential 16. The compact arrangement of the latter and its location frees the space above, through, and below the differential 16 and rear axle 14, at the same time meeting the practical design objectives of a dual engine vehicle with minimum length and minimum weight transfer to the driven rear axle.

FLOOR PULLBACK AND EJECTOR LINKAGE — FIG. 2

The space above and forward of the rear axle 14 is occupied by the floor pullback, ejector linkage, and hydraulic cylinder of an unloading mechanism 27. Such mechanism, specifically, includes the following member shown in solid lines in its normal depending position and further shown in broken lines in its displaced position:

swinging cross beam 28.

Further included in their normal and displaced positions, the latter as shown in broken lines, are the following:

first floor lever link 30
two floor levers 32
second floow lever link 34
ejector lever 36
ejector link 38.

The unloading mechanism 27 further includes:

ejector roller guide 39
common lever anchor 40
hydraulic ejector cylinder 42
ejector gate 44.

The first floor-connected lever link 30 has a floor-connected end 46 for rearwardly pulling a sliding floor, not shown, and the link is operated for thus starting to dump a load by initial extension of the single ejector cylinder 42 rearwardly, causing rearward swinging of the link parallelogram 28, 34, and 32.

Final extension of the ejector cylinder forwardly operates the linkage 36, 38, and ejector gate 44, causing the ejector gate to advance and clear the bowl, not shown, of the remainder of its load.

ENGINE — FIG. 2

A cooling fan 48 for the engine causes its radiator 50 to be supplied with air flow, and a radiator grill 52 is in the path of the airflow at a point rearwardly of the radiator.

Intake air for the engine flows in a path leading from an inlet air pipe canopy 54, through a down pipe 56 and an air cleaner 58, through the centrifugal air compressor 60 of a turbosuperchanger 62, thence, either preferably through an intercooler, not shown, to the engine 22, or else directly to the engine.

Engine exhaust gases flow in a path leading from the engine 22 through the turbine 64 of the turbosupercharger 62, through an up pipe 66, thence out of a leftwardly discharging exhaust pipe terminal 68.

POWER DRIVE TRAIN — FIG. 2

Between the engine flywheel 71 (FIG. 4) in a flywheel housing 72 and drop transfer gear case means 70 in the drive train, torque amplifier means is provided comprising a torque converter 74 connected to the flywheel and having an output. The output enters the transfer case means 70 comprising a 3-year (spur) drop box providing a power path downwardly and to the right side of the engine 22. A first drive line shaft 76 extends fore and aft along the right side of the engine substantially coextensively therewith. A front universal joint 78 places the shaft 76 in power receiving relation to the transfer case means 70 and a rear universal joint 80 connects the shaft 76 and an input transmission shaft 82. The input transmission shaft 82 and a parallel output transmission shaft 84 extend from the front side of a change speed power shift transmission 86.

The transmission 86 is transversely mounted to the frame 88 of the scraper, with the input shaft 82 on the vehicle right side and the output shaft 84 on the left side. A second drive line shaft 90 is connected by a rear universal joint 92 to the transmission output shaft 84, and is connected by a front universal joint 94 to the differential head 18 to exert a differential drive on the axle shafts 20 and rear wheels 10. The second shaft 90 extends fore and aft along the left side of the engine 22 and is substantially coextensive in length therewith.

WRAPAROUND —FIG. 4

In this fanciful developed view, it can be seen that the rearwardly facing engine 22 will require in effect 360° of rotation, in order again to be rearwardly facing in the assembled, short overhang position in which the power train 24 executes a 360° wraparound with respect to the engine 22. In the top plan view, engine rotation will be in the counterclockwise direction of the arrows in order to reach the concentric forward position on a vehicle central longitudinal axis 96 adjacent the rear axle 14.

RELATIONSHIPS

In the leftward direction in terms of the sides of the vehicle, the differential head 18 is laterally offset from the longitudinal vertical plane 96 of the engine and the vehicle, and the output transmission shaft 84 is farther laterally offset on the same side. Therefore, the second drive line shaft 90 spanning therebetween slightly diverges in the rear direction from the center of the vehicle and engine. Similarly, the first drive line shaft 76 diverges in the rearward direction from the center of the engine and vehicle. An engine oil pan 98, having its removed position from the crankcase indicated by broken lines, is accessible for service despite the fact that the shafting 76 and 90 is essentially in the plane of the bottom of the engine as established by the oil pan. The oil pan can be readily dropped because the oil pan area is between such shafting which, though essentially parallel shafting, runs along either side of the bottom of the engine.

The power path through the torque converter 74 leads forwardly in alignment with the engine crankshaft 99 to the transfer case means 70 which is farther ahead, affording removal of the transfer case means 70 and converter 74 from the bottom for easy servicing.

In an upward direction, the engine is vertically offset from the horizontal plane of the differential, and the high-mounting of the engine in the scraper frame 88 has the engine on a level comfortable for a mechanic and protected from the reach of obstacles being passed over underneath. Also in the upward direction, the radiator is vertically aligned with the transmission. The transmission can readily be removed from the bottom for servicing withoug disturbing the engine or the radiator. The input shaft 82 is at a level slightly higher than the level of the output shaft 84 of the transmission, and the first drive shaft 76 and the second drive shaft 90 have the same relation on differing levels.

FRAME STRUCTURE — FIG. 2

Further framing parts are as follows:
frame side rail 100
frame cross member, lower 102
cross member upper, forward 104
cross member upper, forward 106
access door 108
radiator guard 110
rear bumper 112
tow hook 114.

OTHER STRUCTURE — FIG. 1

Other structure is as follows:
tank wells 116
tank well steps 118
side fuel tanks 120
hold-down straps 122
bumper support horns 124.

From the foregoing, it can be appreciated that disposing the drive line shafting longitudinally the same as the engine enables use of suitably liberal length for each of the shafts 76 and 90. So alignment is no problem and less angularity and less wear will occur in the universal joints, compared to stub shafting arrangements such as hitherto have been resorted to in order to achieve compact power train arrangements.

Variations within the spirit and scope of the invention described are equally comprehended by the foregoing description.

What is claimed is:
1. Automotive vehicle comprising:
an engine mounted adjacent one end of the vehicle with its crankshaft disposed longitudinally of the vehicle and having its power output end extending forwardly from said one end and from the engine rear end; and
a power drive train connected to the power output end of the engine providing a path for conveying power, leading from the engine forwardly in alignment with the engine, then downwardly and laterally to one side of the engine, then rearwardly beneath that side of the engine to the engine rear, then laterally beneath the engine rear to the opposite side of the engine, thence forwardly beneath that side of the engine for driving connection with wheels and a wheel axle of the vehicle placed forwardly of the engine.
2. The invention of claim 1, the power train characterized by:
first means in the path for amplified torque conversion of the power;
second means connected to the first means for drop gear transmission of the power;
third means for change speed transmission of the power; and
fourth means for differential deliveryy of power to the wheels and axle.
3. The invention of claim 2, the power train further characterized by:
connections between the second and third means, and third and fourth means, each including line shafting and plural universal joint means, and one of said connections extending from the third means forwardly to the fourth means in a power applying relation and the other to the second means from the third means in a power receiving relation.
4. The invention of claim 3, the engine characterized by:
an engine oil pan area establishing essentially the plane of the bottom of the engine;

the line shafting being essentially in the plane of the bottom of the engine, yet affording servicing accessiblity to the engine pan area between such shafting, running along either side thereof.

5. The invention of claim 3, the line shafting characterized by being:
substantially coplanar and substantially mutually parallel.

6. The invention of claim 3, characterized by:
at least one of said forwardly extending power output end for the engine and said forwardly extending connection to the fourth means being spaced away from the center of the vehicle, and together being essentially in parallelism.

7. The invention of claim 1, characterized by:
first means in the path of the power train for the drop gear transmission of engine power;
second means for change speed transmission of the power;
third means for differential delivery of power to the wheels and axle; and
an engine radiator, said radiator having upward offset from and substantial vertical alignment with the second means.

8. The invention of claim 7, the power train characterized by:
connections between the first and second means, and second and third means, each including line shafting and plural universal joint means, and one of said connections extending from the second means forwardly to the third means in a power applying relation and the other to the first means from the second means in a power receiving relation.

9. The invention of claim 8, the engine characterized by:
an engine oil pan area establishing essentially the plane of the bottom of the engine;
the line shafting being essentially in the plane of the bottom of the engine, yet affording servicing accessibility to the engine pan area between such shafting, running along either side thereof.

10. The invention of claim 8, the power train further characterized by:
the line shafting having substantial coplanarity and substantial mutual parallelism.

11. The invention of claim 8, the power train further characterized by:
the line shafting spaced away from the center of the vehicle, in an arrangement running to either side of the engine.

12. Process of loop transmission of mechanical propulsion power in essentially a 360° circuit, from between a rearfacing source of prime power and vehicle axle means forwardly thereof, said process providing a path with steps by which the power is transmitted from the power output end of the source forwardly in alignment therewith, then conducted downwardly and laterally to one side of the source, then conducted rearwardly beneath that side of the source to the source rear, then conducted laterally beneath the source rear to the opposite side of the source, thence conducted forwardly beneath that side of the source for driving connection with the vehicle axle means.

* * * * *